INVENTORS
Augustine J. Scalzo &
James M. Allen
BY
Frank Christiano Jr.

Dec. 29, 1970   A. J. SCALZO ET AL   3,551,068
ROTOR STRUCTURE FOR AN AXIAL FLOW MACHINE
Filed Oct. 25, 1968   3 Sheets-Sheet 2

Dec. 29, 1970   A. J. SCALZO ET AL   3,551,068
ROTOR STRUCTURE FOR AN AXIAL FLOW MACHINE
Filed Oct. 25, 1968   3 Sheets-Sheet 3

United States Patent Office 3,551,068
Patented Dec. 29, 1970

3,551,068
ROTOR STRUCTURE FOR AN AXIAL FLOW MACHINE
Augustine J. Scalzo, Philadelphia, and James M. Allen, Broomall, Pa., assignors to Westinghouse Electric Corporation, Pittsburgh, Pa., a corporation of Pennsylvania
Filed Oct. 25, 1968, Ser. No. 770,559
Int. Cl. F01d 1/00, 9/00, 25/12
U.S. Cl. 415—173       6 Claims

ABSTRACT OF THE DISCLOSURE

A rotor structure of the aggregative type for an axial flow elastic fluid utilizing machine having a disc carrying rotatable blades is provided with a second disc, spaced, in part, from the first disc, but jointly rotatable therewith. The second disc carries removable sealing segments on its periphery which restrict the radial flow of elastic fluid into the space between the discs.

BACKGROUND AND BRIEF SUMMARY OF THE INVENTION

Figures 1, 4:
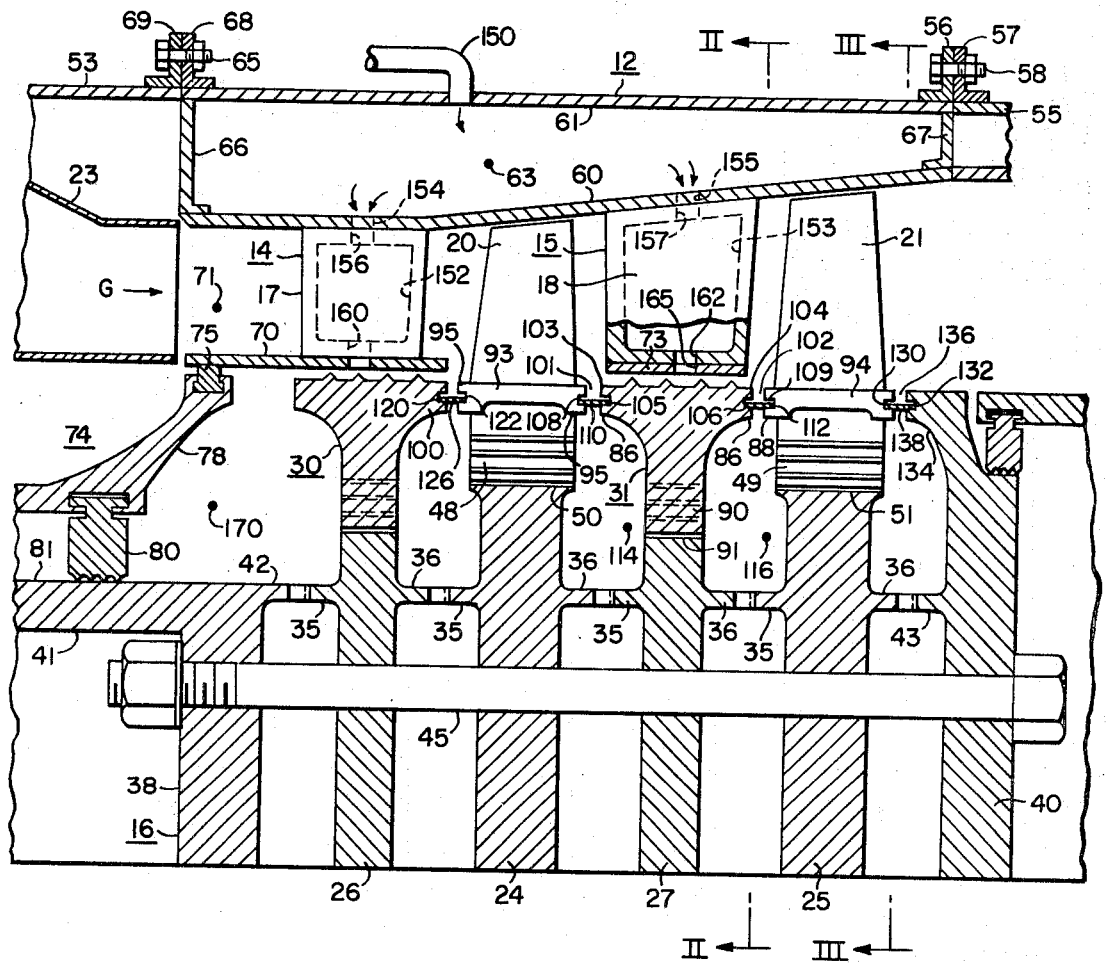

Gas turbines employing hot, pressurized products of combustion generated in a combustion chamber and having rotor structure formed by an aggregation of discs secured to each other and jointly rotatable are well known. To reduce the operating temperature of the rotor discs and to thereby permit the use of less costly materials for the rotor discs, various arrangements have been heretofore utilized to substantially isolate the hot motive fluid from the rotor structure. One such previous arrangement is to secure to the stationary blade diaphragm structure suitable seals which then extend toward the adjacent rotating element to provide a seal restricting the flow of hot motive fluid radially inwardly into the space between adjacent discs of the rotor structure.

Since thermal expansion of the various parts of the turbine may not take place uniformly, and since transient axial and other forces on the rotor structure may exist from time to time, such previously known sealing arrangements have, at times, been subjected to uneven wear, resulting from the localized rubbing of the seal structure with the adjacent rotating part caused by such non-uniform expansion and forces. Thus, it is seen that it would be advantageous to provide a seal structure whose various parts had substantially no rotational movement relative to each other.

In view of the foregoing, it is an object of this invention to provide a sealing arrangement for the space between adjacent discs of a rotor structure which rotates with, and as part of, the rotor structure.

Another object of this invention is to provide a sealing arrangement by which the sealing segment may be easily removed after the rotor has been assembled.

A further object is to provide a sealing arrangement by which only a portion of the structure need be removed should the rotating blades of the adjacent row need to be replaced.

Briefly, in accordance with this invention, there is provided a disc, forming part of the rotor structure, which has on its outer periphery an array of arcuate sealing segments forming a sealing ring concentric with the disc. The sealing ring cooperates with the ring formed by the platforms of the adjacent row of rotating blades to seal the space between the two discs.

The sealing segments have root portions of the side entry type received in complementary recesses in the discs, and the rotating blades may have the same type root portions.

The sealing segments may be spaced from the platforms of the blades in which case the space therebetween is bridged by a sealing band jointly carried by the sealing segments and the platforms, or segments may abut the blade platforms. In either case, the hot motive fluid flowing through the stationary and rotating blades is restricted by the sealing segment, and by the band, where the latter is employed, from flowing radially inwardly into the space between the adjacent discs.

The foregoing and other objects of this invention will become more apparent from the following detailed description thereof taken in conjunction with the accompanying drawings.

BRIEF DESCRIPTION OF THE VIEWS

Figure 2:
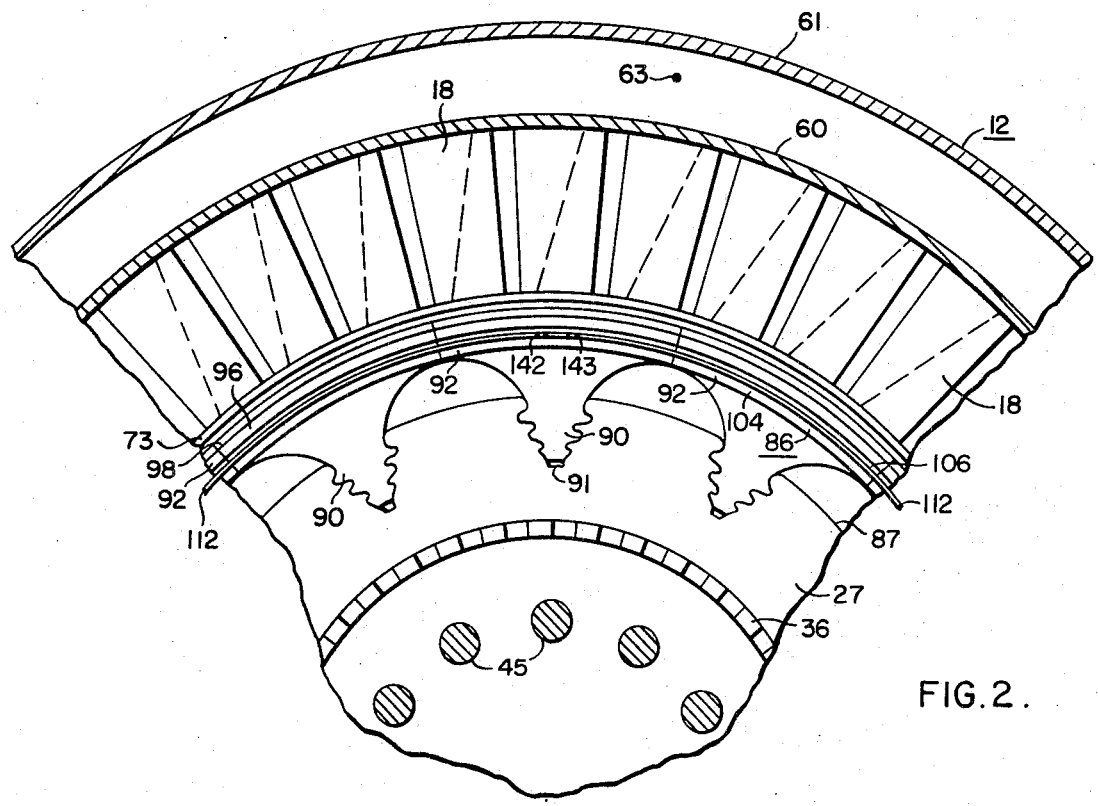
Figure 3:
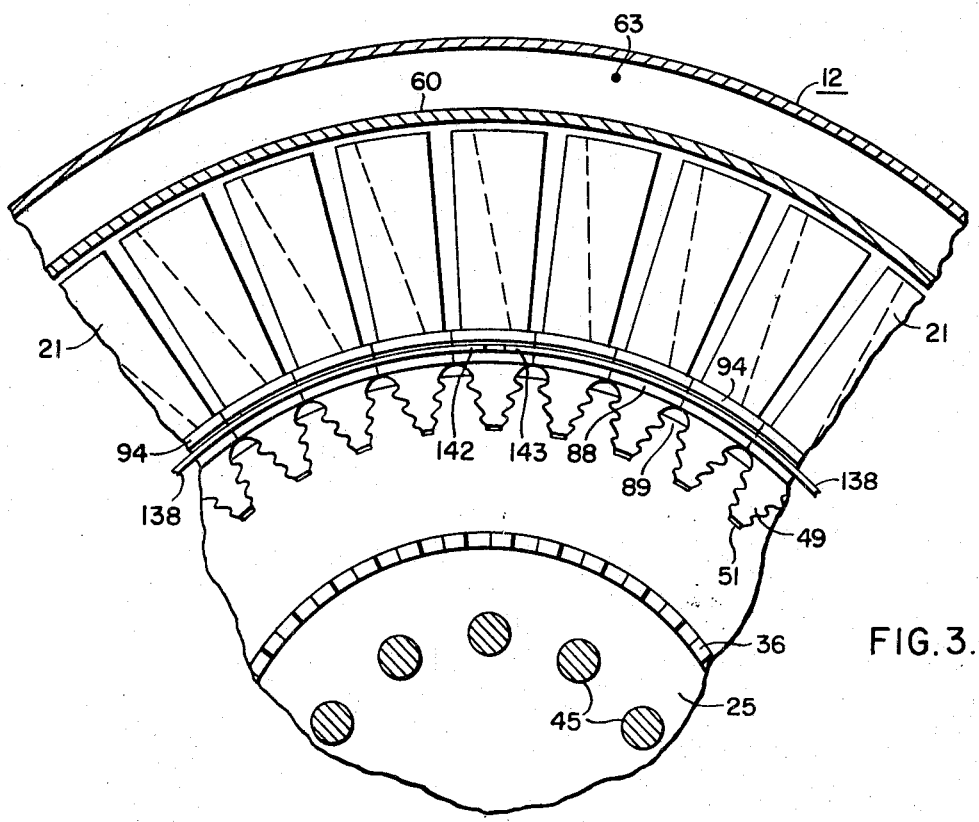
Figure 5:
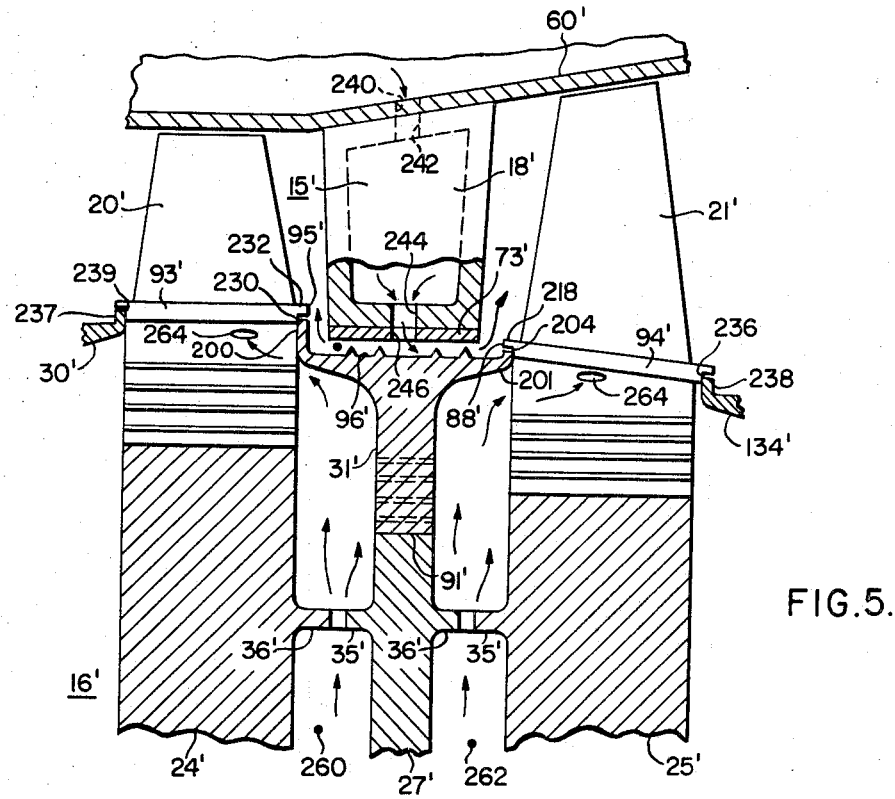
Figure 6:
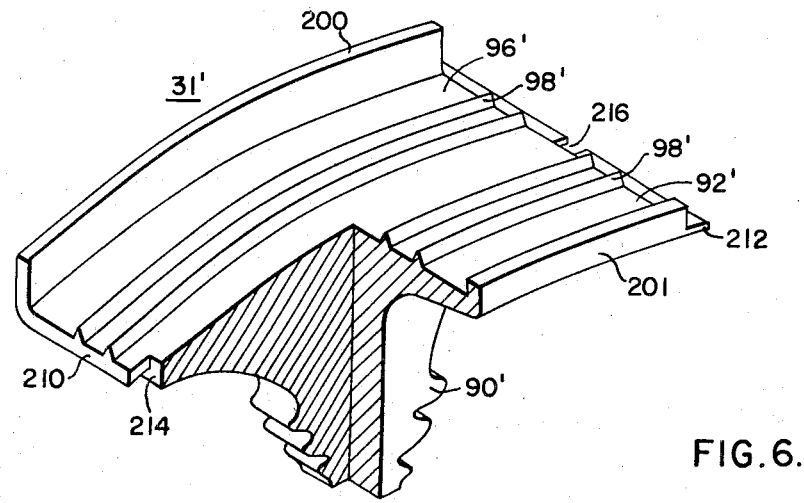

FIG. 1 is a longitudinal, sectional view of a portion of a gas turbine incorporating this invention;
FIG. 2 is a partial, sectional view taken along the line II—II in FIG. 1;
FIG. 3 is a partial, sectional view taken along the line III—III in FIG. 1;
FIG. 4 is a perspective, enlarged view of one of the sealing segments shown in FIG. 1, showing part of the segment in cross-section;
FIG. 5 is a fragmentary view, similar to FIG. 1, but illustrating a modification of this invention; and
FIG. 6 is a perspective view, partly in cross-section, of the modified sealing segment shown in FIG. 5.

DESCRIPTION OF THE PREFERRED EMBODIMENTS

Referring to the drawings, in FIG. 1 there is shown a portion of an axial flow gas turbine 10 incorporating the present invention. Only those portions concerned with the present invention are shown, since gas turbines of this type are well known in the art.

Briefly, gas turbines of the type illustrated employing a tubular shell or case structure 12 having annular diaphragm or nozzle assemblies 14 and 15 disposed therein and cooperatively associated with a rotor structure 16. Each of the diaphragm assemblies 14 and 15 is provided with an annular row of stationary blades 17 and 18, respectively, in juxtaposed relation with corresponding annular rows of rotatable blades 20 and 21, respectively, carried by the rotor structure 16.

Hot pressurized products of combustion, generated in a suitable combustion chamber structure 23, only partially shown in FIG. 1, are directed in an annular stream in the direction indicated by the arrow G (FIG. 1) past the two expansion stages formed by the blades 17 and 20 and the blades 18 and 21, thereby rotating the rotor structure 16 to provide useful mechanical power, as is well known in the art. While only two expansion stages have been illustrated, more or less may be employed, as desired.

The rotor structure 16 is of the aggregative type and includes rotor discs 24 and 25 carrying the rotatable blades 20 and 21, respectively, and rotor discs 26 and 27, the latter, in accordance with this invention, carrying rotating sealing segments 30 and 31, respectively.

Each of the discs 24, 25, 26 and 27 is provided with mutually interlocking oppositely extending annular flange portions 35 and 36. The rotor structure 16 further includes end closure members 38 and 40 at opposite ends, the end members 38 and 40 having annular flange portions 42 and 43, respectively, extending toward each other and interlocking with the adjacent annular flange portions 35 and 36, respectively of the discs 26 and 25. The left hand closure member 38 may be formed as an integral part of the torque tube 41 which connects the rotor structure 16 to the compressor, the latter not illustrated. The rotor structure 16 is maintained in assembled relation by a plurality of through bolts and nuts 45 (only one of which is shown in FIG. 1) which clamp together the end closure members 38 and 40 and the discs 24, 25, 26 and 27. The blades 20 and 21 may be of substantially identical type and are provided with root portions 48 and 49, respectively, of the well known side entry "fir tree" or serrated type which are received in complementary recesses 50 and 51, respectively, formed in the rotor discs 24 and 25.

Also, referring to the case structure 12, an inner case or ring 60 whose right hand portion has a frustoconical shape encompasses the rotor blades 20 and 21. The inner case 60 is secured to, and maintained in concentrically spaced relation with, the cylindrical outer case 61 by annular end spacers 66 and 67, the cases 60 and 61 and the end spacer 66 and 67 defining therebetween an annular plenum chamber 63. Since the flow path for the motive fluid G is divergent, in the downstream direction with respect to motive fluid flow, as is well known in the art, the frustoconical portion of the case 60 is formed so as to define such diverging flow path. The annular spacers 66 and 67 may have L-shapes in cross-section, as shown, and may be suitably secured to the outer case 61 at their outermost circumferential periphery, and to the inner ring 60 at their radially innermost circumferential periphery, for example, by being welded to the cases 60 and 61.

The turbine case structure 12 is secured to the combustion chamber housing 53 by flanges 68 and 69, respectively, the flanges 68 and 69 being secured to each other by suitable bolts and nuts 65.

Similarly, the turbine case structure 12 is secured to the exhaust housing 55 by flanges 56 and 57, respectively, the flanges 56 and 57 being also secured to each other by suitable bolts and nuts 58.

The case structure 12 of the turbine, i.e., the outer case 61, the inner case 60, and the diaphragm structures 14 and 15, are divided into upper and lower halves and secured to each other by suitable horizontal flanges forming part of the case structure, although such flanges are not shown.

The stationary blades 17 and 18 are connected at their radially outermost portions to the inner case 60. The radially innermost portions of the blades 17 and 18 are joined by circumferential shrouds 70 and 73, respectively.

The shroud 70 extends to the left, as shown in FIG. 1, to define, with a part of the inner ring 60, an annular passage 71, juxtaposed with, and in communication with combustion chamber 23. To protect the rotor from the hot gas flow G, an annular seal structure 74 encircles the torque tube 41 and includes a ring 75 contacting the inner surface of the shroud 70, but separate therefrom, the ring 75 having a radially inwardly extending inverted T shape in cross-section keyed in a complementary groove formed in an annular, arm-like member 78, the latter supporting an annular, labyrinth seal member 80 having suitable lands in sealing relation with the cylindrical surface 81 of the torque tube 41.

Referring to FIG. 4, each sealing segment 31 comprises a root portion 90 of the side entry "fir tree," or serrated, type which is received in a complementary recess 91 formed in the rotor disc 27. As shown in FIG. 2, the recesses 91 are formed in the radially outer portion of the disc 27 and are circumferentially equi-spaced from each other around the peripheral portion of the disc 27, but only an arcuate portion of the disc 27 is shown in FIG. 2.

The sealing segments 31 are generally T-shaped when viewed from the side, see FIG. 2, and are also generally T-shaped when viewed in longitudinal cross-section, as shown in FIG. 1. The root portion 90 of each segment 31 is of substantially the same width as that of the rotor disc 27. Each segment 31 includes a horizontal, and radially outer, enlarged arcuate portion 92 extending axially between the platforms 93 and 94 of the adjacent blades 20 and 21, respectively, but the side faces 103 and 104 are spaced therefrom, as shown in FIG. 1, to define spaces 101 and 102 on opposite sides of the segment 31. The radially outer arcuate surface 96 of each segment 31 is formed with spaced rows of annular lands 98, of inverted V-shape in cross-section, the arcuate lands 98 extending radially outwardly from the surface 96 and toward the shroud 73 for restricting the fluid flow between the zone to the left of the blades 18 from the zone to the right thereof. While four lands 98 have been illustrated, it will be understood that more or less may be used.

Referring to FIGS. 2 and 4, the arcuate section 92 of each segment 31 terminates in flat radial surfaces 84, which when the segments 31 are assembled in the disc 27, abut the radial surfaces of adjacent segments. Thus, the assembled arcuate sections 92 together define a ring 86 concentric with the outer surface 87 of the disc 27, but spaced therefrom, as best shown in FIG. 2.

Similarly, when the rotatable blades 21 are assembled to the disc 25, the platforms 94 form a ring 88 concentric with the outer surface 89 of the disc 25, but spaced therefrom, as best shown in FIG. 3. A similar ring 95 is formed by the assembled platforms 93 of the blades 20.

The rings 86 and 88 on the right side of the segments 31 and the rings 95 and 86 on the left side thereof are disposed side-by-side, as shown in FIG. 1.

Bridging the space 101 between the rings 95 and 86 on the left side of the segments 31 is a sealing band 110 to seal, i.e., minimize, the flow of hot gases radially inwardly into the space 114 between the discs 24 and 27. Similarly, bridging the space 102 between the rings 86 and 88 on the right side of the segments 31 is another sealing band 112 to seal, i.e., minimize, the flow of hot gases radially inwardly into the space 116 between the discs 27 and 25.

The side faces 103 and 104 of each segment 31 are provided with open ended grooves 105 and 106 open to the side, as shown. The juxtaposed platforms 93 and 94, of the rotating blades 20 and 21, are also provided with similar grooves 108 and 109, respectively. The band 110 is placed in the juxtaposed grooves 108 and 105, and the band 112 is similarly placed in the juxtaposed grooves 106 and 109.

The sealing segments 30 are constructed similar to the sealing segments 31, the assembled segments 31 forming a ring 100 side-by-side with the ring 95 formed by the platforms 93. However, a groove 120 is only provided on the right hand side of the segments 31, the groove 120 being juxtaposed with a groove 122 in the platforms 93 of the rotating blades 20. A band 126, similar to the previously mentioned bands 110 and 112, bridges the space between the end faces of the sealing segments 30 and the platforms 93 to seal, i.e., minimize the flow of hot gases radially inwardly into the space between the discs 26 and 28.

Likewise, referring to the blades 21, the right hand side face of the ring 88 formed by the platforms 94 is provided with a groove 130 juxtaposed with a groove 132 formed in an integral and annular extending arm 134 of the end closure disc 40, the arm 134 extending toward the left, i.e., toward the adjacent row of blades 21, but spaced therefrom to define a space 136. The space 136 is bridged by a band 138, similar to the bands previously mentioned to seal the space 140 between the discs 25 and 40 to the flow of hot gases.

All of the annular bands 110, 112, 126 and 138 are preferably formed of relatively thin strip material, as shown in FIG. 1. The bands 110, 112, 126 and 138 are all preferably of rectangular shape in cross-section with their widest dimension disposed parallel to the horizontal, longitudinal axis of the rotor structure 16. The bands are sufficiently thin and formed of a material having sufficient flexibility to permit the segments 30 and 31 and the blades 20 and 21 to freely move relative to each other, due to the thermal expansion and contraction, or for other reasons, without imparting deleterious stresses to the segments 30 and 31 or the blades 20 and 21.

The segments 30 and 31, after their root portions are slipped into their complementary recesses in the discs, may be restrained against axial movement by peening or staking local parts of the root portions or of the discs.

The heretofore described structure is particularly advantageous if it is required to replace any rotatable blade. In such event the bolts 58 and 65 are removed from the flanges securing the turbine case structure to the combustion casing structure and the exhaust housing, and the upper case half of the case structure 12 is separated from the lower half of the case structure. Removal of the upper half of the case structure will take with it the upper half of the diaphragm structure. Thus, with the upper half of the diaphragm structure 14 removed, it is possible to drive the segments 30 to the left, in FIG. 1, against the restraint provided by the peening or staking of the segments 30, as the distance between the segment 30 and the arm 74 is greater than the thickness of the disc 26.

Further, the outermost diameter of the disc 26 is less than the bottommost diameter of the root portion of the blades 20 so that they may be slipped axially over and past the disc 26.

Similarly, since the space between the discs 24 and 27 is greater than the width of the root portion 90 of the segment 31, and since the overhanging enlarged head section of the segment 31 is at a diameter greater than the largest diameter of the disc 24, the segment 31 may be slipped to the left until it separates from the disc at which time it may be moved radially outwardly.

The blades 21 may be removed as described in connection with the blades 20.

In operation, as hot motive fluid flows past the stationary blades 17 and 18 and the rotatable blades 20 and 21, the blades, discs and sealing segments rapidly become heated and undergo some relative thermal expansion. This thermal expansion is initially not usually uniform in the blades, segments and discs, but the annular bands are sufficiently thin and flexible so that any relative radial movement of one disc relative to the adjacent disc is freely permitted. This movement is freely permitted by virtue of the fact that the grooves for the bands are wider than the thickness of the bands and the fact that each band is not a continuous hoop, but rather has one joint formed initially by abutting ends 142 and 143 which are free to separate from each other as the discs expand radially outwardly, see FIGS. 2 and 3.

Further, the bands are sufficiently thin that axial movement of the disc toward each other may tend to bow the bands slightly. Axial movement of adjacent blades away from each other is freely permitted as the bands lie loosely within the grooves, since the grooves are wider than the thickness of the bands, but such axial movement is minimal, however.

Connected in communication with the annular chamber 63, and secured to the outer case 61, is a pipe 150 which is supplied with a pressurized cooling fluid, such as air or the like, from a suitable source, not illustrated.

As indicated by the arrows, the coolant fluid enters the hollow interiors 152 and 153 of the stationary blades 17 and 18, respectively, through suitable holes 154 and 155 in the inner case 60 and holes 156 and 157 in the blades.

The radial inner portions of the blades 17 and 18 are provided with apertures 160 and 162, respectively, communicating with similar apertures 164 and 165 in the shrouds for directing the coolant fluid radially inwardly toward the annular faces 166 and 96 of the sealing segments 30 and 31, respectively.

Referring to the blades 17 and the sealing segments 30, part of the coolant fluid emitted through the aperture 164 flows to the left between the shroud 70 and the annular surfaces 166 of the sealing segments 30, and enters the annular space 170 to cool the disc 26 and the torque tube 41. Part of the coolant fluid emitted from the aperture 164 also flows to the right, tending to cool the radially inner portion of the rotary blades 20 and their platforms 93, and also mixing with the gas stream.

Referring to the blades 18 and the sealing segments 31, part of the coolant fluid emitted through the apertures 165 flows to the left and part flows to the right between the shroud 73 and the annular surfaces 96 of the sealing segments 31 toward the radially inner portion of the blades 20 and 21, to cool the radially inner portions thereof, and also mixes with the gas stream. Accordingly, the diaphragm structures 14 and 15 and the segments 30 and 31 are prevented from becoming excessively overheated by the continuous flow of the coolant fluid.

Referring to FIGS. 5 and 6, a modification of the invention is illustrated in which the sealing segments 31' are similar to the sealing segments 31 illustrated in connection with FIGS. 1 to 4, inclusive, but in the present modification the sealing segment 31' is provided with arcuate, radially outwardly extending, upturned lips 200 and 201 on opposite sides of each segment, the lips 200 and 201 being in sealing relation with the rings 95' and 88' formed by the platforms 93' and 94' of the blades 20' and 21'.

The sealing segments 31' are carried by a disc 27', the disc 27' being secured for joint rotation between discs 24' and 25'. The discs 24', 25' and 27' are secured to each other by flanges 35' and 36' and are held in assembled relation by a bolt and nut arrangement (not shown), but similar to the arrangement illustrated in FIG. 1.

Between the blades 20' and 21', and encircling the sealing segments 31', is a diaphragm or nozzle structure 15' comprising stationary blades 18' whose innermost portions are secured together by a shroud 73' and whose outermost portions are connected to a case 60'.

The sealing segment 31', as shown in FIG. 6, also has a general T shape, with a root portion 90' and an enlarged, arcuate portion 92'. The root portion 90' is also of the side entry "fir tree" shape and is carried by the disc 27' in a suitable complementary, side entry recess 91'.

The enlarged portion 92' includes an arcuate surface 96' from which project lands 98'. The arcuate, upturned lips 200 and 201 extend radially outwardly, as shown, on each side of the enlarged portion 92'. Opposite ends of the segments 31' overlap, since the end portions of the segments are rabbeted, whereby abutting ends of adjacent segments form a rabbet joint, in FIG. 6 the left hand end portion forming the top section 210 of the joint and the right hand end portion forming the bottom section 212 of the joint. To aid in the flow of cooling fluid toward the disc, the central portions of the sections 210 and 212 may be notched, as shown at 214 and 216.

Referring to the left side of the platforms 94', an arcuate shoulder 204 is formed to receive the arcuate lip 201, each shoulder 204 being formed by a projecting arcuate finger 218, the array of which is concentric with and encircles the lip 201. The right hand, annular and vertical surface formed by the annular array of lips 201 abuts the annular and vertical surface formed by the annular array of shoulders 204, as shown, while the upper, circular surface formed by the array of lips 201 is preferably slightly spaced from the lower, circular surface formed by the fingers 218. Thus, the engagement of the circular surface formed by the annular array of the lips 201 with the circular surface formed by the annular array of shoulders 204 provides a seal restricting the flow of the hot motive gases radially inwardly into the space 262 between the discs 27' and 25'.

Similarly, the platforms 93' are formed with shoulders 230 partially defined by fingers 232 the array of which encircles the lips 200 and are in sealing relation therewith. Thus, the left hand circular surface formed by the lips 200 abuts the right hand circular surface of the platforms 93'.

The blade 21', on the right hand side, may also be formed with a shoulder 236, similar to the left shoulder 204, to receive in sealing relation therewith an arcuate lip 238 which may be formed integral with an arm 134' of the right hand end closure member (not shown) of the rotor 16'.

Likewise, the blade 20' on the left hand side, may also be formed with a shoulder 239, similar to the right shoulder 230, to receive in sealing relation therewith an arcuate lip 237 which may be formed integral with a segment 30' (a fragment thereof only being shown in FIG. 5), the segment 30' being carried by another disc, not shown, but similar to the disc 26 shown in FIG. 1.

As described in connection with FIGS. 1 to 4, cooling fluid is supplied to the hollow interior of the blades 19' through openings 240 and 242 and the fluid is emitted through openings 244 and 246 into the annular space 250 between the shroud 73' and the annular surface 96', the cooling fluid flowing axially to the left and to the right to cool the blades 18' and the segments 31'.

If desired, cooling fluid may also be supplied to the central portion of the rotor structure 16' in which event it will flow outwardly in the spaces 260 and 262 between the discs 24', 25' and 27' as indicated by the arrows in FIG. 5. This cooling fluid will flow into the space between adjacent rotating blades and radially outwardly through suitable holes 264 in the platforms.

While the invention has been shown in several forms, it will be obvious to those skilled in the art that it is not so limited, but is susceptible of various other changes and modifications without departing from the spirit thereof.

We claim as our invention:

1. An axial flow elastic fluid utilizing machine comprising
   a tubular casing,
   a rotor disposed within said casing,
   said rotor including a disc having an annular row of rotatable blades,
   a diaphragm structure disposed within said casing and having an annular row of stationary blades in cooperative relation with said rotatable blades,
   said rotor including a second disc connected to said first disc for joint rotation therewith and defining with said first disc a space,
   means carried by said second disc and cooperating with said first disc for sealing said space to the radial flow of said elastic fluid into said space,
   said stationary blades including radially innermost portions,
   an annular shroud connected to said radially innermost portions,
   said means comprising arcuate sealing segments carried about the periphery of said second disc,
   said shroud and sealing segments having opposed, spaced concentric annular surfaces in fluid flow restricting relation to each other,
   said sealing segments and said rotatable blades including juxtaposed side portions spaced from each other and defining opposed, concentric grooves, and
   a flexible band within said grooves for bridging said side portions and restricting the flow of elastic fluid into the space between said discs.

2. A rotor for an axial flow machine comprising,
   a first disc having an annular row of rotatable blades,
   said rotor including a second disc axially spaced from, but connected to, said first disc for joint movement therewith,
   an annular array of sealing segments carried by said second disc,
   said sealing segments and rotating blades having juxtaposed portions forming concentric annular surfaces cooperating to substantially seal said space to the flow therein of said elastic fluid,
   means to secure said discs to each other for joint rotation,
   a flexible band extending axially between said discs and carried by said discs,
   said blades and segments having root portions of the side entry type, and
   said discs having recesses to receive said root portions.

3. An axial flow elastic fluid utilizing machine comprising
   a tubular casing,
   a rotor disposed within said casing,
   said rotor including first and second discs each carrying an annular row of rotatable blades,
   a diaphragm structure disposed within said casing, between said rotatable blades, and having an annular row of stationary blades in cooperative relation with said rotatable blades,
   said rotor including a third disc connected to said first and second discs for joint rotation therewith, said third disc defining spaces on opposite sides thereof with said first and second discs,
   an annular array of sealing segments carried by said third disc about its outer periphery,
   said rotatable blades being carried in complementary recesses in said first and second discs,
   said blades and segments having root portions of the side entry type received in said recesses,
   the space between the first and third disc being sufficient to permit said segment to be moved axially thereinto for removing said segments,
   said segments having a generally T shape when viewed in longitudinal cross-section of said machine,
   the outer diameter of the first disc being small enough to permit the segments to be removed by axial movement toward said first disc,
   adjacent parts of said blades and segments defining jointly rotatable circular surfaces restricting the flow of motive fluid therebetween and having concentric, side entry annular grooves, and
   a band within said grooves to substantially seal against the flow of motive fluid between said parts.

4. The machine recited in claim 3 wherein said blades include platforms, said segments form circular surfaces on opposite sides thereof which abut circular surfaces formed by said platforms of said rotatable blades.

5. The machine recited in claim 3 wherein adjacent segments form a rabbet joint, and the circular surfaces interfit one another.

6. The machine recited in claim 4 wherein the outer diameter of said third disc is less than the inner diameter about which said root portions of the rotatable blades carried by the second disc are disposed, whereby the blades carried by said second disc may be removed by axial movement thereof toward and over said third disc after said sealing segments are removed.

References Cited

UNITED STATES PATENTS

| 2,625,367 | 1/1953 | Rainbow et al. | 253—39.1 |
| 2,743,080 | 4/1956 | Feilden | 253—77 |
| 3,411,794 | 11/1968 | Allen | 253—39 |

FOREIGN PATENTS

| 706,730 | 4/1954 | Great Britain | 253—39 |

HENRY F. RADUAZO, Primary Examiner

U.S. Cl. X.R.

415—115